US010466765B2

(12) United States Patent
Jouin et al.

(10) Patent No.: US 10,466,765 B2
(45) Date of Patent: Nov. 5, 2019

(54) SYSTEMS AND METHODS FOR MANAGING POWER CONSUMED BY A MICROCONTROLLER IN AN INACTIVE MODE

(71) Applicant: Microchip Technology Incorporated, Chandler, AZ (US)

(72) Inventors: Sebastien Jouin, La Chapelle Launay (FR); Patrice Menard, Saint Mars du Désert (FR); Thierry Gourbilleau, Le Loroux Bottereau (FR); Mikael Tual, Campbon (FR); Thibault Kervaon, Carquefou (FR); Bernard Coloma, Nantes (FR)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 252 days.

(21) Appl. No.: 15/682,746

(22) Filed: Aug. 22, 2017

(65) Prior Publication Data
US 2019/0064916 A1    Feb. 28, 2019

(51) Int. Cl.
G06F 1/3206    (2019.01)
G06F 1/3234    (2019.01)
G06F 1/3293    (2019.01)

(52) U.S. Cl.
CPC .......... *G06F 1/3243* (2013.01); *G06F 1/3206* (2013.01); *G06F 1/3293* (2013.01)

(58) Field of Classification Search
None
See application file for complete search history.

(56) References Cited

U.S. PATENT DOCUMENTS

| 5,913,911 A * | 6/1999 | Beck ............... B63B 49/00 |
| | | 701/1 |
| 8,782,454 B2 | 7/2014 | Heller et al. ............ 713/323 |
| 2003/0041272 A1* | 2/2003 | Nguyen ............ G06F 1/26 |
| | | 713/300 |
| 2014/0028278 A1 | 1/2014 | Pedersen et al. ......... 323/304 |
| 2015/0249335 A1 | 9/2015 | Waheed et al. .......... 307/33 |

FOREIGN PATENT DOCUMENTS

WO    2009/144661 A1    12/2009    ........... G06F 1/32

OTHER PUBLICATIONS

International Search Report and Written Opinion, Application No. PCT/US2018/047160, 13 pages, dated Nov. 22, 2018.

* cited by examiner

*Primary Examiner* — Paul Yen
(74) *Attorney, Agent, or Firm* — Slayden Grubert Beard PLLC

(57) ABSTRACT

Embodiments of the present disclosure include a power management unit for controlling power in a microcontroller. The unit causes a first voltage to be provided in an active mode. In a sleep mode, the unit determines whether a supply voltage is less than an upper reference voltage and, if so, cause a second voltage greater than the first voltage to be provided. If not, the unit inhibits operation of voltage regulation of power supplied to the microcontroller. After inhibition of operation of voltage regulation, the unit determines whether the supply voltage has fallen to a lower reference voltage and, if so, applies the second voltage to the microcontroller.

19 Claims, 5 Drawing Sheets

SYSTEMS AND METHODS FOR MANAGING POWER CONSUMED BY A MICROCONTROLLER IN AN INACTIVE MODE

TECHNICAL FIELD

Embodiments of the present disclosure are directed to power management and, more particularly, to systems and methods for managing power consumed by a microcontroller in an inactive mode are provided.

BACKGROUND

Microcontrollers are often used in low power applications to provide control signals to devices in which they are installed (e.g., devices that operate from battery power). Many microcontrollers for low power applications can enter an inactive mode in which the state of the microcontroller can be maintained, but in which the microcontroller does not operate to provide control signals as it does in the active mode. However, such low power microcontrollers use circuits for providing an internal supply voltage that are typically designed to optimize efficiency in either the active more or the inactive mode, as it is difficult to design such circuits for high efficiency in both modes. This can lead to wasting power in either the active or sleep modes, as the circuits are not optimized for efficiency in both.

SUMMARY

In accordance with some embodiments of the disclosed subject matter, systems and methods for managing power consumed by a microcontroller in an inactive mode are provided.

In accordance with some embodiments of the disclosed subject matter, a microcontroller operable in an active mode and a sleep mode is provided, the microcontroller comprising: a voltage supply line connectable to ground via an external decoupling capacitor; a voltage regulator coupled to the voltage supply line and configured to apply to the voltage supply line one of a first voltage and a second voltage greater than the first voltage; a voltage monitor coupled to the voltage supply line and configured to: compare a supply voltage on the voltage supply line to a third voltage that is greater than the first voltage, to produce a first signal; and compare the supply voltage to a fourth voltage that is less than the first voltage, to produce a second signal; a power management unit electrically connected to the voltage regulator and to the voltage monitor and configured to: determine whether the microcontroller is in the active mode or the sleep mode; responsive to a determination that the microcontroller is in the active mode, cause the voltage regulator to apply the first voltage to the voltage supply line; responsive to a determination that the microcontroller is in the sleep mode: determine from the first signal whether the supply voltage is less than the third voltage; responsive to a determination that the supply voltage is less than the third voltage, cause the voltage regulator to apply the second voltage to the voltage supply line; and responsive to a determination that the supply voltage is not less than the third voltage, inhibit operation of the voltage regulator at a first time; subsequent to the first time, determine from the second signal whether the supply voltage has fallen to the fourth voltage; and responsive to a determination that the supply voltage has fallen to the fourth voltage, cause the voltage regulator to apply the second voltage to the voltage supply line at a second time; and circuits that output control signals from the microcontroller to one or more devices electrically connected to the microcontroller, the circuits drawing power from the voltage supply line and the decoupling capacitor for a time period between the first time and the second time.

In some embodiments, the second voltage and the third voltage are approximately equal.

In some embodiments, the circuits require a minimum voltage during the sleep mode, and the fourth voltage is greater than the minimum voltage.

In some embodiments, the power management unit is further configured to: inhibit operation of the voltage monitor at the first time; and cause the voltage monitor to operate at regular intervals between the first time and the second time, wherein the intervals between operations of the voltage monitor correspond to a predetermined period of time.

In some embodiments, the microcontroller further comprises a counter that is configured to store a value corresponding to total time elapsed between the first time and the second time, wherein the power management unit is further configured to: calculate a second predetermined period of time based on the value, wherein the second predetermined period of time is different than the predetermined period of time.

In some embodiments, a method for managing a microcontroller operable in an active mode and a sleep mode is provided, the method comprising: determining whether the microcontroller is in the active mode or the sleep mode; responsive to a determination that the microcontroller is in the active mode, causing a first voltage to be supplied by a voltage regulator to a voltage supply line connected to ground via an external decoupling capacitor; responsive to a determination that the microcontroller is in the sleep mode, causing a second voltage greater than the first voltage to be supplied by the voltage regulator to the voltage supply line; comparing, by a voltage monitor coupled to the voltage supply line, a supply voltage on the voltage supply line to a third voltage that is greater than the first voltage; determining, based on the comparison of the supply voltage to the third voltage, whether the supply voltage is less than the third voltage; responsive to a determination that the supply voltage is less than the third voltage, causing the second to be supplied to the voltage supply line; and responsive to a determination that the supply voltage is not less than the third voltage, inhibiting operation of the voltage regulator at a first time; subsequent to the first time, comparing, by the voltage monitor, the supply voltage on the voltage supply line to a fourth voltage that is less than the first voltage; determining, based on the comparison of the supply voltage to the fourth voltage, whether the supply voltage has fallen to the fourth voltage; and responsive to a determination that the supply voltage has fallen to the fourth voltage, causing the second voltage to be supplied by the voltage regulator to the voltage supply line at a second time; and providing power, during a time period between the first time and the second time, from the voltage supply line and the decoupling capacitor to circuits that output control signals from the microcontroller to one or more devices electrically connected to the microcontroller.

Figure 1:
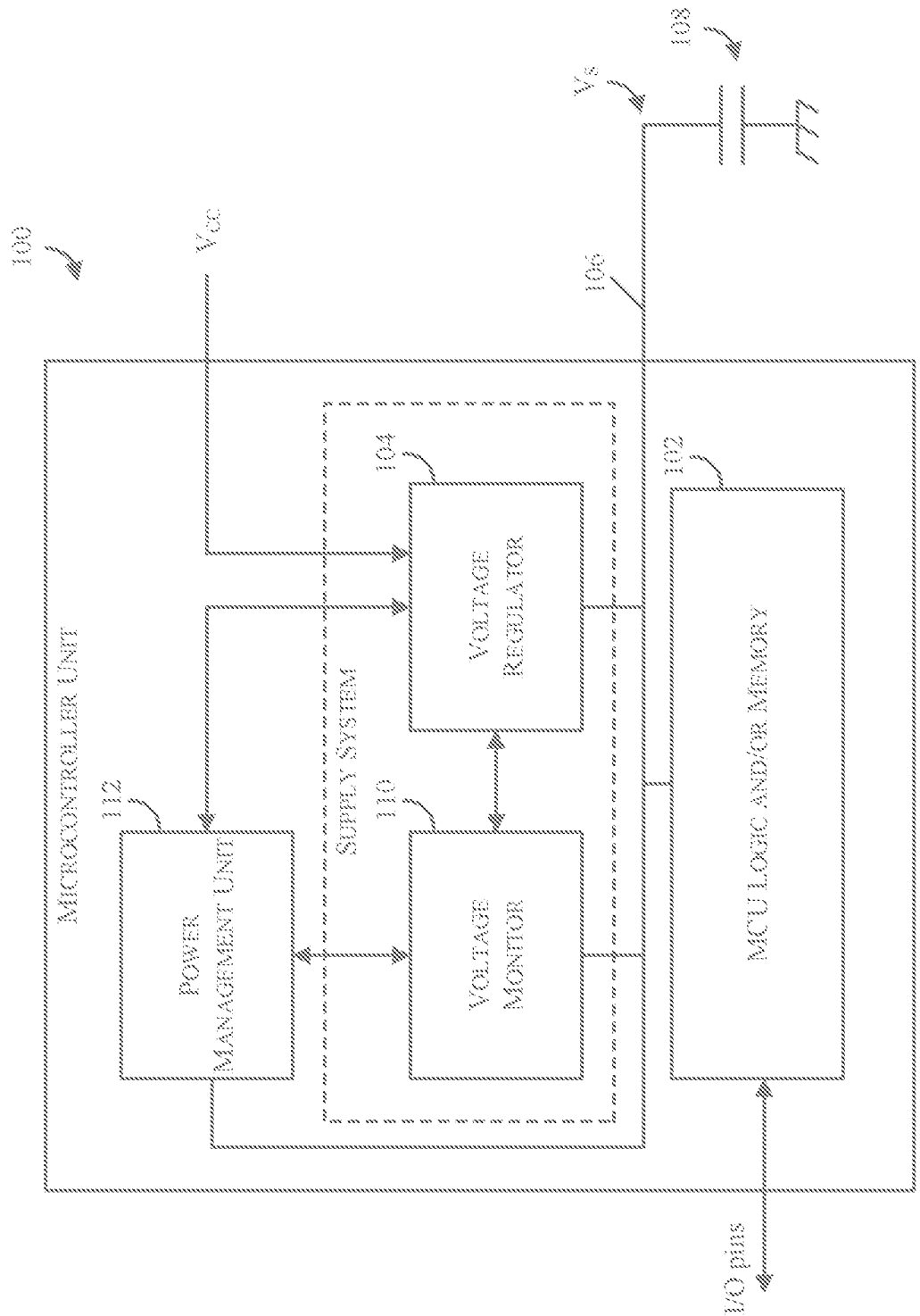
FIG. 1 shows an example of a microcontroller configured to manage power consumed in an inactive mode in accordance with some embodiments of the disclosed subject matter.

While the present disclosure is susceptible to various modifications and alternative forms, specific example embodiments thereof have been shown in the drawings and are herein described in detail. It should be understood, however, that the description herein of specific example embodiments are not intended to limit the disclosure to the particular forms disclosed herein.

DETAILED DESCRIPTION

In accordance with various embodiments, mechanisms (which can, for example, include systems and methods) for managing power consumed by a microcontroller in an inactive mode are provided.

In some embodiments of the subject matter disclosed herein, a microcontroller can include a voltage regulator that is configured to maintain a constant internal supply voltage during an active mode of the microcontroller. For example, the voltage regulator can convert an external supply voltage (e.g., $V_{CC}$) to an internal supply voltage to supply power to circuits of the microcontroller that are used to provide control signals to a device in which the microcontroller is installed.

In some embodiments, the microcontroller can enter an inactive mode (sometimes referred to as a "standby mode" or "sleep mode") when not being used to provide control signals. For example, if the device in which the microcontroller is installed is not used for a predetermined period of time, or if the device is put into a sleep mode, the microcontroller can attempt to conserve power by entering the inactive mode.

In some embodiments, the microcontroller can include a power management unit that can operate during the inactive state to alternately boost the internal supply voltage to a boost voltage level and turn off the voltage regulator until the voltage falls to a threshold voltage. For example, the power management unit can cause the voltage regulator to boost the internal supply voltage to an elevated level (e.g., a boost level) when the microcontroller enters the sleep mode. In such an example, when the internal supply voltage reaches a predetermined boost voltage, the power management unit can stop operations of the voltage regulator to conserve power. While the voltage regulator is turned off, the internal supply voltage can go down over time due to leakage in the microcontroller and operation of certain circuits (e.g., the power management unit) while in the inactive mode. In some embodiments, power can be provided during the inactive mode from an external decoupling capacitor coupled between an internal voltage supply line and ground that can store power (i.e., in an electric field) that was charged by the voltage regulator.

In some embodiments, when the internal supply voltage falls below a threshold voltage (e.g., due to leakage, usage by components that are active in the inactive period, and any other losses), the power management unit can re-enable the voltage regulator to boost the voltage back to the boost level.

FIG. 1 shows an example 100 of a microcontroller configured to manage power consumed in an inactive mode in accordance with some embodiments of the disclosed subject matter. As shown in FIG. 1, microcontroller 100 can include logic and/or memory 102 that can be used to, for example, receive input (e.g., from a system being controlled by microcontroller 100), calculate values, and provide output (e.g., to the system being controlled by microcontroller 100). In some embodiments, input and output can be received and provided using any suitable input and/or output pins coupled to logic and/or memory 102.

In some embodiments, microcontroller 100 can include a voltage regulator 104 that can be configured to maintain a voltage ($V_S$) of an internal voltage supply line 106 at a particular level. In some embodiments, voltage regulator 104 can be implemented with any suitable circuits using any suitable technique or combination of techniques. For example, in some embodiments, voltage regulator 104 can be implemented using a DC-to-DC converter. Considerations for the implementation of voltage regulator 104 may include that voltage regulator 104 may utilize a voltage reference in order to function correctly. In some cases, such a voltage reference may be internal to voltage regulator 104. In other cases, such a voltage reference may be external to voltage regulator 104, wherein the voltage reference might be shutted down in the same manner as voltage regulator 104. In some embodiments, voltage regulator 104 can be controlled to maintain $V_S$ at different levels based on the mode of microcontroller 100 (e.g., as described below). As shown in FIG. 1, in some embodiments, voltage regulator 104 can receive an external supply voltage $V_{CC}$, and use $V_{CC}$ to maintain $V_S$ on internal voltage supply line 106 at a particular internal supply voltage, which can be used to supply an operating voltage to other components of microcontroller unit 100 (e.g., logic and/or memory 102). Additionally, in some embodiments, an external decoupling capacitor 108 can be connected between internal voltage supply line 106 and ground. In some embodiments, decoupling capacitor 108 can be implemented using any suitable technique or combination of techniques. For example, decoupling capacitor 108 can be implemented using one or more capacitor components connected in series and/or parallel. The capacitance range to implement decoupling capacitor 108 may be, for example, 100 nF to 10 uF. The higher the capacitance value, the more efficient power consumption may be.

In some embodiments, a voltage monitor 110 can compare $V_S$ on internal voltage supply line 106 to a value based on the current state of microcontroller 100, and can indicate a status of $V_S$ to a power management unit 112. In some embodiments, voltage monitor 110 can be implemented with any suitable circuits using any suitable technique or combination of techniques. Voltage monitor 110 may be implemented, for example, with a voltage comparator or a brown-out detector. In some embodiments, operation of voltage monitor 110 can be powered using the voltage on internal voltage supply line 106. In other embodiments, voltage monitor 110 may be powered VCC or another external voltage through a supply voltage input to microcontroller 100. In some embodiments, voltage monitor 110 can provide feedback to voltage regulator 104 (e.g., during an active mode) to facilitate maintenance of a particular voltage on internal voltage supply line 106. Accordingly, a safe voltage level is applied to processing logic and memories. When a safe voltage is unavailable, a global reset may be performed. The feedback may be passed from voltage monitor 110 to voltage regulator 104 through control logic inside the power management unit 112.

In some embodiments, power management unit 112 can control operation of voltage regulator 104 based on a mode (e.g., active or inactive) of microcontroller 100 and/or a state of microcontroller 100 during a particular mode. In some embodiments, power management unit 112 can be implemented with any suitable circuits using any suitable technique or combination of techniques. For example, power management unit 112 may be implemented with logic circuits that receive commands from the CPU of microcontroller 100. Power management unit 112 may translate these commands to logic signals that control or receive inputs to or from voltage regulator 104 and voltage monitors. Power management unit 112 may be developed with a hardware description language and physically translated to logic gates by a synthesis tool. In some embodiments, power management unit 112 can receive an indication from voltage monitor 110 that is indicative of the voltage on internal voltage supply line 106. For example, as described below in connection with FIGS. 2 and 3, voltage monitor 110 can output a value to power management unit 112 to indicate whether $V_S$ has reached a boost voltage, has fallen below a trigger voltage, etc. In some embodiments, operation of power management unit 112 can be powered using the voltage on internal voltage supply line 106. Power management unit 112 may be powered by internal voltage supply line 106, though it may be supplied by VCC as well. In some embodiments, power management unit 112 can include any other suitable circuits, such as a counter (e.g., as described below in connection with FIGS. 4 and 5), a finite state machine that can be used to store a current state of microcontroller 100 and/or power management unit 112, etc.

Figure 2:
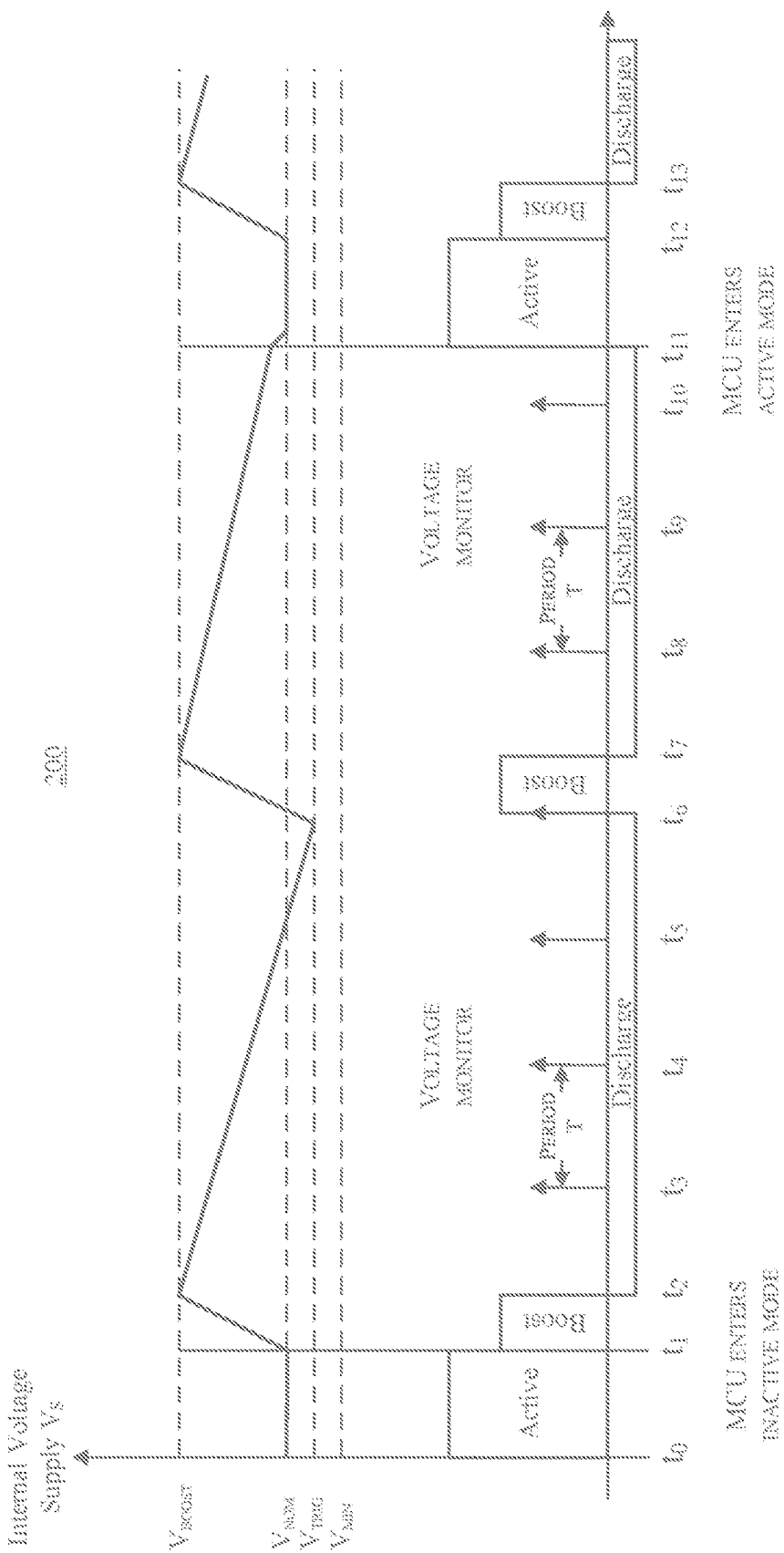
FIG. 2 shows an example of voltage on an internal supply line during different operational modes and states of a microcontroller in accordance with some embodiments of the disclosed subject matter.

FIG. 2 shows an example 200 of voltage on an internal supply line (e.g., internal supply line 106) during different operational modes and states of a microcontroller (e.g., microcontroller 100) in accordance with some embodiments of the disclosed subject matter. As shown in FIG. 2, during an active mode of microcontroller 100 (e.g., from $t_0$ to $t_1$), voltage on internal supply line 106 can be maintained by voltage regulator 104 at a nominal operating voltage $V_{nom}$. In some embodiments, $V_{nom}$ can be any suitable value that can be used to power operation of components of microcontroller 100 during an active mode. For example, $V_{nom}$ can be 0.9 V, 1 V, 1.2 V, etc. In some embodiments, power management unit 112 can provide a control signal to voltage regulator 104 during active mode of microcontroller 100 to instruct voltage regulator 104 to maintain $V_S$ at $V_{nom}$. In some embodiments, control of voltage regulator 104 can be implemented using any suitable technique or combination of techniques. For example, the control signal can be provided constantly during operation in active mode (e.g., a high value of the control signal provided to voltage regulator 104 can cause voltage regulator 104 to maintain $V_{nom}$). As another example, the control signal can be provided during a state change (e.g., form inactive mode to active mode) and stored by voltage regulator 104 (e.g., as a state of a state machine).

At $t_1$, microcontroller 100 can enter an inactive mode, and power management unit 112 can transition to a boost state during which $V_S$ is raised to a boost level $V_{boost}$ through control of voltage regulator 104. The value of $V_{boost}$ may be, for example, $V_{nom}$ plus 100 mV or 200 mV, or ten-to-twenty percent above $V_{nom}$. In some embodiments, power management unit 112 can provide a second control signal to voltage regulator 104 during the boost state to instruct voltage regulator 104 to increase $V_S$ to $V_{boost}$. In some embodiments, the second control signal can be a different value of the control signal provided during active mode and/or can be an additional and/or different control signal provided to voltage regulator 104. In some embodiments, voltage monitor 110 can monitor the value of $V_S$ during the boost state to determine whether it has reached $V_{boost}$. In some embodiments, decoupling capacitor 108 can act as storage for power provided to internal voltage supply line 106 during the boost state.

At $t_2$, when $V_S$ reaches $V_{boost}$, voltage monitor 110 can indicate to power management unit 112 that $V_{boost}$ has been reached, and power management unit 112 can enter a discharge state during which voltage regulator 104 is inhibited from operating, and during which voltage monitor 110 is generally inhibited from operating, but is intermittently operated to determine whether $V_S$ has fallen below a threshold value $V_{trig}$. In some embodiments, power management unit 112 can control an operational state of voltage regulator 104 and/or voltage monitor 110 using any suitable control signals. For example, power management unit 112 can control a switch (e.g., a transistor) in voltage regulator 104 (and/or external to voltage regulator 104) to interrupt a path between $V_{CC}$ and a voltage converter of voltage regulator 104. As another example, power management unit 112 can control a switch (e.g., a transistor) in voltage monitor 110 (and/or external to voltage monitor 110) to interrupt a path internal voltage supply line 106 and logic in voltage monitor 110 that monitors voltage on internal voltage supply line 106. In some embodiments, inhibiting operation of voltage regulator 104 and/or voltage monitor 110 can decrease the amount of power consumed by microcontroller 100 during the discharge state. As shown in FIG. 2, during the discharge state the voltage on the internal supply line is reduced by leakage current and/or by operation of power management unit 112 and/or other processes that remain active in the inactive state.

After a predetermined period of time has passed after entering the discharge state (e.g., time period T), at $t_3$ power management unit 112 can enable operation of voltage monitor 110 to determine whether $V_S$ has fallen below a threshold voltage $V_{trig}$ that is greater than the minimum voltage $V_{min}$ below which the state of logic and/or memory 102 is likely to be lost. In some embodiments, time period T between measurements by voltage monitor 110 can be any suitable length of time. For example, power management unit 112 can enable operation of voltage monitor 110 every 1 millisecond (ms). In some embodiments, power management unit 112 can continue to enable operation of voltage monitor 110 after each period (e.g., at $t_3$, $t_4$, $t_5$, and $t_6$) until voltage monitor 110 indicates that $V_S$ has reached (e.g., fallen to or below) $V_{trig}$. $V_{min}$ may be the absolute minimum value for which the logic and memory retention features are maintained. $V_{min}$ may be within the range of twenty percent less than $V_{nom}$. $V_{trig}$ may be greater than $V_{min}$ and may be within the range of ten percent less than $V_{nom}$. In some embodiments, $V_{trig}$ can be any suitable value between $V_{boost}$ and $V_{min}$. For example, in some embodiments, $V_{trig}$ can be a value halfway between $V_{boost}$ and $V_{min}$ $$\left(\text{i.e., } V_{trig} = \frac{V_{boost} - V_{min}}{2}\right).$$

At $t_6$, when $V_S$ has fallen below $V_{trig}$, power management unit 110 can enter the boost state, and enable voltage regulator 104 and/or voltage monitor 110 to raise the voltage back to $V_{boost}$. In some embodiments, this cycle of alternately entering the boost state and the discharge state based on the value of $V_S$ can continue until microcontroller 100 enters the active state (e.g., at $t_{11}$), at which point power management unit 112 can control operation of voltage regulator 104 to return $V_S$ to $V_{nom}$. Note that the values of $V_{nom}$, $V_{boost}$, $V_{trig}$, and $V_{min}$, described above are merely examples, and the mechanisms described herein can be used over any suitable range of operating conditions and/or voltages.

Figure 3:
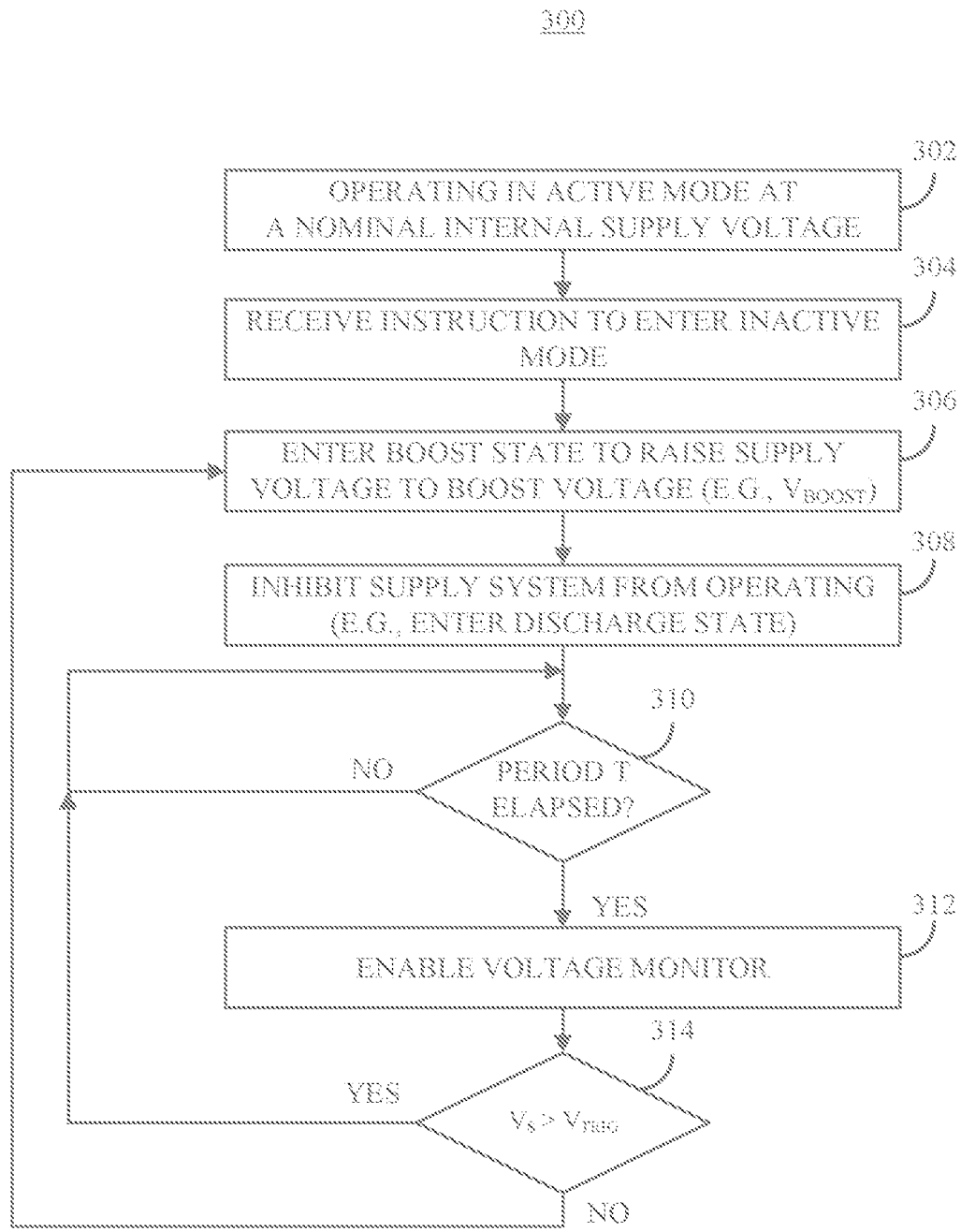
FIG. 3 shows an example of a process for managing power consumed by a microcontroller in an inactive mode in accordance with some embodiments of the disclosed subject matter.

FIG. 3 shows an example 300 of a process for managing power consumed by a microcontroller in an inactive mode in accordance with some embodiments of the disclosed subject matter. As shown in FIG. 3, process 300 can begin at 302 with microcontroller 100 operating in active mode with the internal supply voltage maintained at a nominal voltage. For example, at 302, process 300 can be operating as shown in FIG. 2 between times $t_1$ and $t_2$.

At 304, process 300 can receive an instruction indicating that the microcontroller is entering an inactive mode. In some embodiments, process 300 can receive the instruction using any suitable technique or combination of techniques, and the instruction can be received as any suitable input signal. For example, if process 300 is being executed at least in part by power management unit 112, power management unit 112 can receive the instruction from another portion of microcontroller 100 (e.g., from a portion of logic and/or memory 102) and/or from a source external to microcontroller 100 (e.g., via a pin).

At 306, process 300 can raise the internal supply voltage to $V_{boost}$. For example, as described above in connection with FIG. 2, process 300 can cause a device executing process 300 (e.g., power management unit 112, microcontroller 100, etc.) to enter a boost state. In a more particular example, power management unit 112 can control operation of voltage regulator 104 and/or voltage monitor 110 to raise the internal supply voltage to $V_{boost}$.

At 308, process 300 can inhibit the supply system (e.g., voltage regulator 104 and/or voltage monitor 110) of the microcontroller from operating. For example, as described above in connection with FIG. 2, process 300 can cause a device executing process 300 (e.g., power management unit 112, microcontroller 100, etc.) to enter a discharge state.

At 310, process 300 can determine whether a time period T has elapsed since the voltage monitor was last operational. For example, as described above in connection with FIG. 2, process 300 can determine whether the period T has elapsed since power management unit 112 entered the discharge state (e.g., from time $t_2$ to time $t_3$) and/or whether the time period T has elapsed since the last time voltage monitor 110 was turned on to monitor voltage of internal supply line 106. Power management unit 112 may use a clock internal to microcontroller 100 for calculating time periods.

If time period T has not elapsed ("NO" at 310), process 300 can return to 310 to wait for time period T to elapse. Otherwise, if time period T has elapsed ("YES" at 310), process 300 can move to 312, and enable the voltage monitor (e.g., voltage monitor 110). At 314, process 300 can receive an indication from the voltage monitor indicating whether the voltage should be boosted back to $V_{boost}$. For example, at 314, process 300 can receive an indication from voltage monitor 110 indicating whether the voltage is still above $V_{trig}$ (i.e., indicating that $V_S > V_{trig}$). If process 300 determines that the voltage is still above $V_{trig}$ ("YES" at 314), process 300 can return to 310 to wait for the next time period T to elapse. Otherwise, if process 300 determines that the voltage has fallen below $V_{trig}$ ("NO" at 314), process 300 can return to 306 to boost voltage on internal voltage supply line 106 back to $V_{boost}$. In some embodiments, another process can be executed in parallel to determine whether the microcontroller is transitioning back to active mode, and the outcome of such a process can supersede process 300 (e.g., as shown in FIG. 2 at time $t_{11}$).

Figure 4:
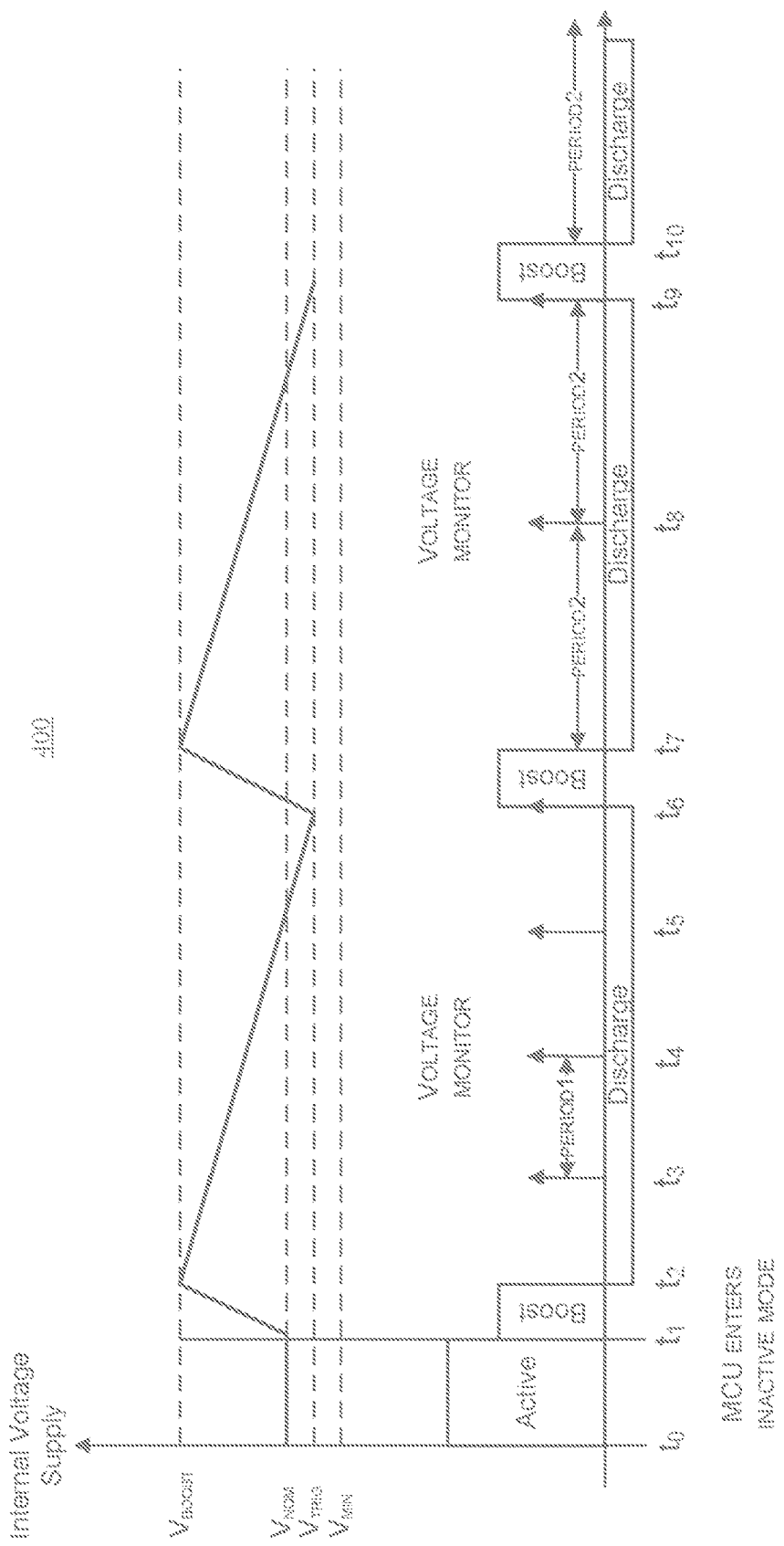
FIG. 4 shows another example of voltage on an internal supply line during different operational modes and states of a microcontroller in accordance with some embodiments of the disclosed subject matter.

FIG. 4 shows another example 400 of voltage on an internal supply line (e.g., internal supply line 106) during different operational modes and states of a microcontroller (e.g., microcontroller 100) in accordance with some embodiments of the disclosed subject matter. As shown in FIG. 4, the time period during which the voltage monitor is inhibited from operating is adaptively changed based on the time that elapsed between operations in the boost state. For example, as shown in FIG. 4, during the time from $t_2$ to $t_6$ the voltage monitor is operated four times to measure voltage on the voltage supply line. As described below in connection with FIG. 5, the number of measurements (or periods) that occur between boost states can be used to calculate a new time period T2 (e.g., period 2) that can be used to determine time between measurements. Adaptively controlling the time period between measurements can, in some embodiments, further reduce the amount of power used during an inactive mode of the microcontroller. Note that the slope of the voltage in the discharge state can change over time (e.g., based on environmental conditions), and the period can be calculated such that it is unlikely that the voltage on the internal voltage supply line will fall below $V_{min}$ during a time period in which the voltage monitor is being inhibited from operating. For example, in some embodiments, the leakage in a microcontroller in the inactive mode can increase with increases in temperature, but to increase the leakage by a factor large enough to reduce the voltage on the supply line below $V_{min}$ between measurements by the voltage monitor may require a very rapid increase in temperature. In a more particular example, if the leakage increased by a factor of four with an increase of about 30 degrees Centigrade, the increase in temperature would need to happen in a very short time (e.g., on the order of 100 ms given an initial time period of 1 ms) in order to drop the voltage below $V_{min}$.

Figure 5:
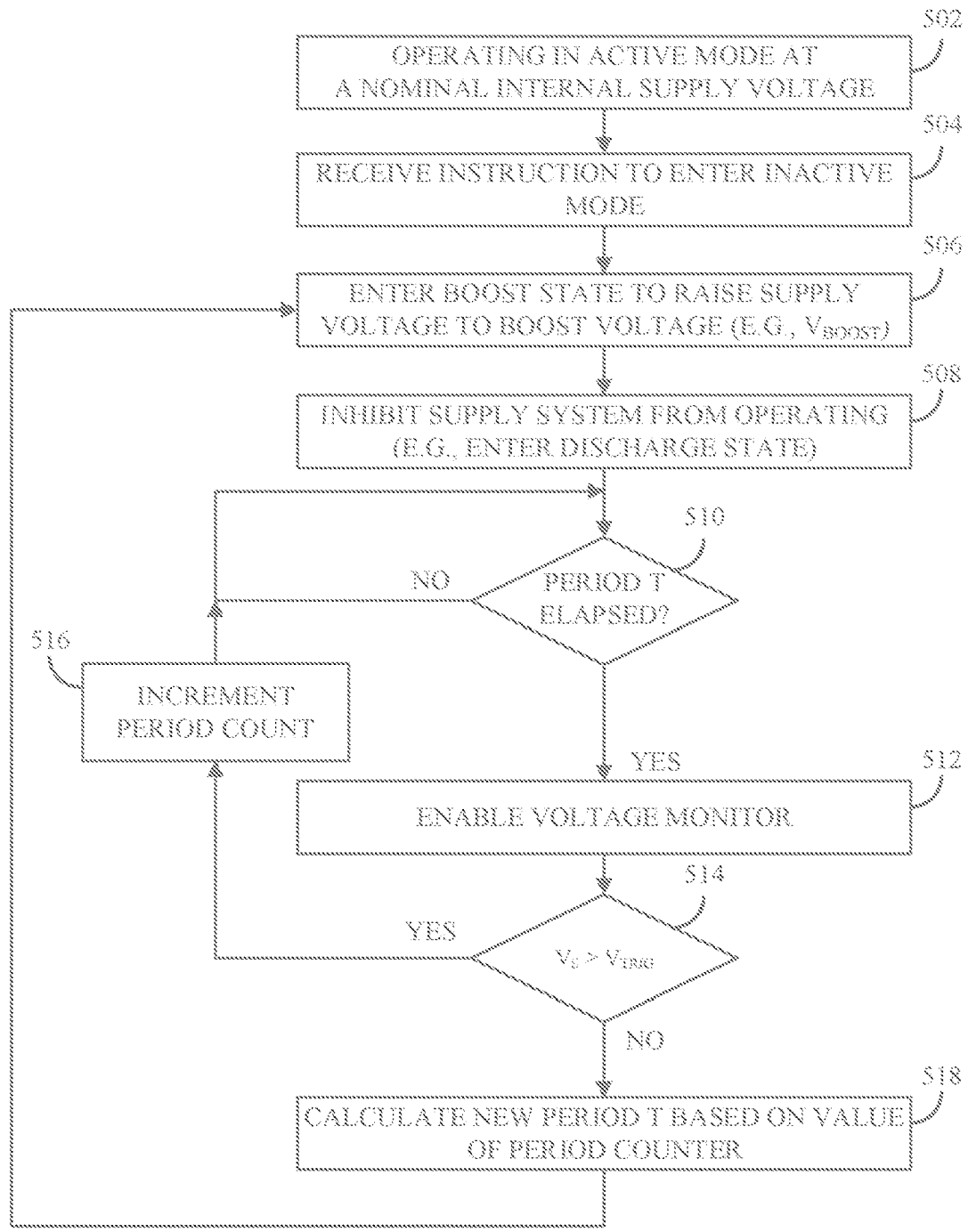
FIG. 5 shows an example of a process for managing power consumed by a microcontroller in an inactive mode using an adaptively calculated time period in accordance with some embodiments of the disclosed subject matter.

FIG. 5 shows an example 500 of a process for managing power consumed by a microcontroller in an inactive mode using an adaptively calculated time period in accordance with some embodiments of the disclosed subject matter. In some embodiments, 502-508 of process 500 can be similar to 302-308 of process 300.

At 510, process 500 can determine whether a time period T1 has elapsed since the voltage monitor was last operational. For example, as described above in connection with FIGS. 2 and 4, process 500 can determine whether the time period T1 has elapsed since power management unit 112 entered the discharge state (e.g., from time $t_2$ to time $t_3$) and/or whether the time period T1 has elapsed since the last time voltage monitor 110 was turned on to monitor voltage of internal supply line 106.

If time period T1 has not elapsed ("NO" at 510), process 500 can return to 510 to wait for time period T1 to elapse. Otherwise, if time period T1 has elapsed ("YES" at 510), process 500 can move to 512, and enable the voltage monitor (e.g., voltage monitor 110). At 514, process 500 can receive an indication from the voltage monitor indicating whether the voltage should be boosted back to $V_{boost}$. For example, at 514, process 500 can receive an indication from voltage monitor 110 indicating whether the voltage is still above $V_{trig}$ (i.e., indicating that $V_S > V_{trig}$). If process 500 determines that the voltage is still above $V_{trig}$ ("YES" at 514), process 500 can move to 516 to add the time period to a count of the total time of periods elapsed (and/or the number of measurements that have been taken) since the voltage was raised to $V_{boost}$. For example, a counter can start at a value of zero, and in response to each execution at 516 can be increased by the value of time period T1. In a more particular example, for a period of 1 ms, the value of the counter after five periods can be 5 ms. As another more particular example, for a period of 2 ms, the value of the counter after five periods can be 10 ms. Alternatively, the length of the period can be stored, and a counter can increment by one in response to each execution of 516. For example, regardless of the length of the time period, the value of the counter after five periods can be five, and the calculation of a new time period (e.g., as described below in connection with 518) can be based on the stored length of the time period and the value of the counter. In some embodiments, the count can be reset when the discharge state is entered (and/or at any other time), and/or any other technique can be used to determine the total time of periods that have elapsed (and/or measurements that have been taken) since the boost state (e.g., based on a difference between the value of the counter when the discharge state was entered and the value when the boost state is subsequently entered). Process 500 can return to 510 to wait for another time period T1 to elapse.

Otherwise, if process 500 determines that the voltage has fallen below $V_{trig}$ ("NO" at 514), process 500 can move to 518 and calculate a new period T2 based on the value of the counter incremented at 516 to track the number of periods that elapsed between boost states. In some embodiments, the new period can be calculated using any suitable technique or combination of techniques. For example, if the counter stores the total time elapsed between boosts (i.e., the counter adds the length of the period to the value of the counter) the new period can be calculated by dividing the value of the counter by two (or any other suitable value). In a more particular example, if the time period T1 is 1 ms, and four time periods elapse between boosts, the new time period can be calculated as 4 ms/2=2 ms. In another more particular example, if the time period T1 is 2 ms, and one time period elapsed between boosts, the new time period can be calculated as 2 ms/2=1 ms. Alternatively, if the counter stores the number of periods that have elapsed between boosts and the time period is stored separately, the new period can be calculated by multiplying the value of the counter by the length of the time period and dividing by two. Process 500 can return to 506 to boost the voltage on the internal voltage supply line back to $V_{boost}$. As described above in connection with process 300 and FIG. 3, another process can be executed in parallel to determine whether the microcontroller is transitioning back to an active state, and the outcome of such a process can supersede process 500. In some embodiments, the initial time period T1 can be set to a default value each time the microcontroller enters the inactive state. Alternatively, the initial time period T1 can be set to the last value calculated at 518 the last time the microcontroller was in the inactive state.

Note that the number of time periods that elapse between boost states can vary based on the particular implementation of microcontroller 100 and the number of periods shown in FIGS. 3 and 5 are shown merely for ease of explanation.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that the above described steps of the processes of FIGS. 3 and 5 can be executed or performed in any order or sequence not limited to the order and sequence shown and described in the figures. Also, some of the above steps of the processes of FIGS. 3 and 5 can be executed or performed substantially simultaneously where appropriate or in parallel to reduce latency and processing times.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A microcontroller operable in an active mode and a sleep mode and comprising:
   a voltage supply line connectable to ground via an external decoupling capacitor;
   a voltage regulator circuit coupled to the voltage supply line and configured to apply to the voltage supply line one of a first voltage and a second voltage greater than the first voltage;
   a voltage monitor circuit coupled to the voltage supply line and configured to:
      compare a supply voltage on the voltage supply line to a third voltage that is greater than the first voltage, to produce a first signal; and
      compare the supply voltage to a fourth voltage that is less than the first voltage, to produce a second signal;
   a power management unit circuit electrically connected to the voltage regulator circuit and to the voltage monitor circuit and configured to:
      determine whether the microcontroller is in the active mode or the sleep mode;
      responsive to a determination that the microcontroller is in the active mode, cause the voltage regulator circuit to apply the first voltage to the voltage supply line;
      responsive to a determination that the microcontroller is in the sleep mode:
         determine from the first signal whether the supply voltage is less than the third voltage;

responsive to a determination that the supply voltage is less than the third voltage, cause the voltage regulator circuit to apply the second voltage to the voltage supply line; and responsive to a determination that the supply voltage is not less than the third voltage, inhibit operation of the voltage regulator circuit at a first time;

subsequent to the first time, determine from the second signal whether the supply voltage has fallen to the fourth voltage; and responsive to a determination that the supply voltage has fallen to the fourth voltage, cause the voltage regulator circuit to apply the second voltage to the voltage supply line at a second time; and circuits configured to output control signals from the microcontroller to one or more devices electrically connected to the microcontroller, the circuits configured to draw power from the voltage supply line and the decoupling capacitor for a time period between the first time and the second time.

2. The microcontroller of claim 1, wherein the second voltage and the third voltage are approximately equal.

3. The microcontroller of claim 1, wherein the circuits require a minimum voltage during the sleep mode, and the fourth voltage is greater than the minimum voltage.

4. The microcontroller of claim 1, wherein the power management unit circuit is further configured to:
inhibit operation of the voltage monitor circuit at the first time; and
cause the voltage monitor circuit to operate at regular intervals between the first time and the second time, wherein the intervals between operations of the voltage monitor circuit correspond to a predetermined period of time.

5. The microcontroller of claim 4, further comprising a counter that is configured to store a value corresponding to total time elapsed between the first time and the second time, wherein the power management unit circuit is further configured to:
calculate a second period of time based on the value, wherein the second period of time is different than the predetermined period of time.

6. A method for managing a microcontroller operable in an active mode and a sleep mode, the method comprising:
determining whether the microcontroller is in the active mode or the sleep mode;
responsive to a determination that the microcontroller is in the active mode, causing a first voltage to be supplied by a voltage regulator circuit to a voltage supply line connected to ground via an external decoupling capacitor;
responsive to a determination that the microcontroller is in the sleep mode, causing a second voltage greater than the first voltage to be supplied by the voltage regulator circuit to the voltage supply line;
comparing, by a voltage monitor circuit coupled to the voltage supply line, a supply voltage on the voltage supply line to a third voltage that is greater than the first voltage;
determining, based on the comparison of the supply voltage to the third voltage, whether the supply voltage is less than the third voltage;

responsive to a determination that the supply voltage is less than the third voltage, causing the second to be supplied to the voltage supply line; and responsive to a determination that the supply voltage is not less than the third voltage, inhibiting operation of the voltage regulator circuit at a first time;

subsequent to the first time, comparing, by the voltage monitor circuit, the supply voltage on the voltage supply line to a fourth voltage that is less than the first voltage;

determining, based on the comparison of the supply voltage to the fourth voltage, whether the supply voltage has fallen to the fourth voltage; and responsive to a determination that the supply voltage has fallen to the fourth voltage, causing the second voltage to be supplied by the voltage regulator circuit to the voltage supply line at a second time; and providing power, during a time period between the first time and the second time, from the voltage supply line and the decoupling capacitor to circuits that output control signals from the microcontroller to one or more devices electrically connected to the microcontroller.

7. The method of claim 6, wherein the second voltage and the third voltage are approximately equal.

8. The method of claim 6, wherein the circuits require a minimum voltage during the sleep mode, and the fourth voltage is greater than the minimum voltage.

9. The method of claim 6, further comprising:
inhibiting operation of the voltage monitor circuit at the first time; and
causing the voltage monitor circuit to operate at regular intervals between the first time and the second time, wherein the intervals between operations of the voltage monitor circuit correspond to a predetermined period of time.

10. The method of claim 9, further comprising:
generating, using a counter, a value corresponding to total time elapsed between the first time and the second time; and
calculating a second period of time based on the value, wherein the second period of time is different than the predetermined period of time.

11. A power management unit (PMU) for controlling power in a microcontroller, comprising circuitry configured to:
determine whether the microcontroller is in an active mode or a sleep mode;
based on a determination that the microcontroller is in the active mode, cause a first voltage to be provided to the microcontroller;
based on a determination that the microcontroller is the sleep mode:
determine whether a supply voltage of the microcontroller is less than an upper reference voltage;
based on a determination that the supply voltage is less than the upper reference voltage, cause a second voltage to be provided to the microcontroller, the second voltage greater than the first voltage;
based on a determination that the supply voltage is greater than or equal to the upper reference voltage, inhibit operation of voltage regulation of power supplied to the microcontroller;
after inhibition of operation of voltage regulation, determine whether the supply voltage has fallen to a lower reference voltage; and based on a determination that the supply voltage has fallen to the lower reference voltage, apply the second voltage to the microcontroller.

12. The PMU of claim 11, further comprising a connection to an external decoupling capacitor.

13. The PMU of claim 11, further comprising circuitry configured to connect to a voltage regulator, the circuitry to provide the power to the microcontroller.

14. The PMU of claim 11, further comprising circuitry configured to connect to a voltage monitor, the circuitry to receive indications of statuses of the supply voltage.

15. The PMU of claim 11, further comprising circuitry to provide power to output circuits of the microcontroller from power from an external decoupling capacitor after inhibition of voltage regulation.

16. The PMU of claim 11, wherein the second voltage and the upper reference voltage are approximately equal.

17. The PMU of claim 11, wherein output circuits of the microcontroller require a minimum voltage during the sleep mode, and the lower reference voltage is greater than the minimum voltage.

18. The PMU of claim 11, further comprising circuitry to alternately and periodically inhibit and enable voltage monitoring after voltage regulation is inhibited.

19. The PMU of claim 18, further comprising:
a counter configured to store a value corresponding to total time elapsed after voltage regulation is inhibited until the determination that the supply voltage has fallen to the lower reference voltage and the second voltage is provided;
circuitry configured to adjust a period of alternately inhibiting and enabling voltage monitoring based upon the value.

* * * * *